UNITED STATES PATENT OFFICE.

REUBEN E. NICHOLS, OF PHILADELPHIA, PENNSYLVANIA.

COMPOSITION FOR PRESERVING AND WATERPROOFING.

SPECIFICATION forming part of Letters Patent No. 349,172, dated September 14, 1886.

Application filed February 18, 1886. Serial No. 192,427. (Specimens.)

*To all whom it may concern:*

Be it known that I, REUBEN E. NICHOLS, a citizen of the United States, residing in the city and county of Philadelphia, State of Pennsylvania, have invented a new and useful Improvement in Preserving and Waterproofing Compounds, which improvement is fully set forth in the following specification.

My invention consists of a compound for preserving and waterproofing stone, brick, wood, cloth, paper, and other materials.

In carrying out my invention I take creosote, one part; paraffine-wax, ten parts; paraffine-oil, one part; benzole, one part; naphthaline, one part, making fourteen parts, which may, however, be varied, and combine said ingredients, and heat them until they are dissolved, after which I add two to ten parts of naphtha, benzine, or other hydrocarbon fluid, and filter the whole, the product then being ready for use.

Stone, brick, wood, &c., are brushed or otherwise coated with the compound, and further coated with naphtha, benzine, or other hydrocarbon, said coatings being repeated until the pores or grain of the stone, &c., are filled.

Cloth, paper, &c., may be saturated with the compound or brushed therewith, the result in all cases being that the material treated will have a thoroughly preservative and water-proof nature imparted to it.

In the treatment of the materials the compound is applied thereto in either a hot or cold state, as required.

Having thus described my invention, what I claim as new, and desire to secure by Letters Patent, is—

1. The composition of matter for preserving and waterproofing purposes, consisting of creosote, paraffine-wax, paraffine-oil, benzole, and naphthaline, to which is added a hydrocarbon fluid, substantially as set forth.

2. A preserving and waterproofing compound consisting of creosote, paraffine-wax, paraffine-oil, benzole, and naphthaline, with naphtha, benzine, or other hydrocarbon, as described.

REUBEN E. NICHOLS.

Witnesses:
 JOHN A. WIEDERSHEIM,
 A. P. GRANT.